United States Patent
Hong

(10) Patent No.: US 12,423,551 B2
(45) Date of Patent: Sep. 23, 2025

(54) CABLE-TYPE RADIO FREQUENCY IDENTIFICATION TAG

(71) Applicant: YOKE INDUSTRIAL CORP., Taichung (TW)

(72) Inventor: Rong-Der Hong, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 135 days.

(21) Appl. No.: 18/451,835

(22) Filed: Aug. 17, 2023

(65) Prior Publication Data
US 2024/0412028 A1  Dec. 12, 2024

(30) Foreign Application Priority Data
Jun. 9, 2023 (TW) ................................. 112121556

(51) Int. Cl.
*G06K 19/077* (2006.01)
*G06K 19/07* (2006.01)

(52) U.S. Cl.
CPC ... *G06K 19/07749* (2013.01); *G06K 19/0723* (2013.01)

(58) Field of Classification Search
CPC .......... G06K 19/07749; G06K 19/0723; F16G 11/106; G09F 3/0335; G09F 3/0352
See application file for complete search history.

(56) References Cited

U.S. PATENT DOCUMENTS

| | | | | |
|---|---|---|---|---|
| 1,139,595 A | * | 5/1915 | Starr | G09F 3/0323 403/368 |
| 3,770,307 A | * | 11/1973 | Van Gompel | F16G 11/108 292/307 R |
| 4,640,538 A | * | 2/1987 | Brammall | F16G 11/106 292/323 |
| 4,681,355 A | * | 7/1987 | Brammall | F16G 11/14 292/323 |
| 4,747,631 A | * | 5/1988 | Loynes | F16G 11/14 292/307 R |
| 5,222,776 A | * | 6/1993 | Georgopoulos | F16G 11/14 292/307 R |
| 5,538,300 A | * | 7/1996 | Brown | G09F 3/0352 292/307 R |
| 5,647,620 A | * | 7/1997 | Kuenzel | G09F 3/0352 292/307 R |
| 6,457,754 B1 | * | 10/2002 | Bystry | F16G 11/101 292/307 R |
| 7,412,898 B1 | * | 8/2008 | Smith | F16B 31/025 73/761 |

(Continued)

*Primary Examiner* — Ryan W Sherwin
(74) *Attorney, Agent, or Firm* — Apex Juris, pllc; Cera Oh

(57) ABSTRACT

A cable-type radio frequency identification tag includes a cable clamp having a fixing hole and a through hole. A receiving space for receiving a ratchet gear is provided beside the through hole. A pin hole penetrates through two opposite surfaces of a clamp body. A protecting case harder than the cable clamp is wrapped around the cable clamp and includes a case body and a cover plate. A rivet body is riveted on the case body, a hole of the cover plate, and the pin hole of the cable clamp and has a head portion. A radio frequency identification block fits in a counterbore of the head portion. A cable is fixed in the fixing hole. A free end of the cable penetrates through the through hole to be fixed by the ratchet gear to form a fitting ring.

8 Claims, 8 Drawing Sheets

(56) References Cited

U.S. PATENT DOCUMENTS

| | | | |
|---|---|---|---|
| 10,635,963 B2* | 4/2020 | Grove | G06K 19/07773 |
| 11,631,931 B2* | 4/2023 | Hong | G06K 7/10108 |
| | | | 235/492 |
| 12,165,491 B2* | 12/2024 | Redaelli | G08B 21/187 |
| 2004/0256865 A1* | 12/2004 | Rogatnev | G09F 3/0317 |
| | | | 292/315 |
| 2005/0156437 A1* | 7/2005 | Ching | G09F 3/0352 |
| | | | 292/315 |
| 2005/0231365 A1* | 10/2005 | Tester | G09F 3/0347 |
| | | | 292/307 R |
| 2009/0071211 A1* | 3/2009 | Stone | G09F 3/0352 |
| | | | 70/451 |
| 2010/0283580 A1* | 11/2010 | Sheng | G09F 3/0347 |
| | | | 340/5.31 |
| 2012/0139699 A1* | 6/2012 | Chen | G09F 3/0335 |
| | | | 340/5.61 |
| 2012/0217307 A1* | 8/2012 | Martin | G06K 19/027 |
| | | | 29/601 |
| 2013/0026771 A1* | 1/2013 | Nazzari | G09F 3/0352 |
| | | | 292/317 |
| 2013/0200637 A1* | 8/2013 | Dreisbach | F16G 11/106 |
| | | | 292/323 |
| 2014/0097255 A1* | 4/2014 | Kelrich | G06K 19/07758 |
| | | | 235/492 |
| 2016/0247056 A1* | 8/2016 | Nitta | G06K 19/07771 |
| 2016/0356292 A1* | 12/2016 | Chua | G09F 3/0352 |
| 2017/0280688 A1* | 10/2017 | Deliou | A01K 11/008 |
| 2018/0025673 A1* | 1/2018 | Ritamäki | G09F 3/0352 |
| | | | 340/572.8 |
| 2019/0266457 A1* | 8/2019 | Salsberg | G06K 19/0723 |
| 2022/0414410 A1* | 12/2022 | Zhao | G06K 19/0723 |
| 2023/0258026 A1* | 8/2023 | Bullard | E05B 83/02 |
| | | | 70/51 |
| 2024/0371244 A1* | 11/2024 | Zhao | G06K 19/0723 |

* cited by examiner

CABLE-TYPE RADIO FREQUENCY IDENTIFICATION TAG

BACKGROUND OF THE INVENTION

Technical Field

The present invention relates generally to a radio frequency identification tag, and more particularly to a cable-type radio frequency identification tag.

Description of Related Art

A conventional disposable tag, such as a conventional lead seal for water meters and electricity meters, are mainly used for anti-theft or secrecy purposes. Such lead seal could also be applied to a lock or a position that that requires identity identification, such as a device, a container, or a valve of a liquid pipeline. In the conventional lead seal, a fitting block or an electronic tag is fixed on two ends of a wire, and the conventional lead seal could only be opened with a destructive manner, thereby ensuring that the lead seal fixed at the position is always the same one.

Although the conventional disposable tag, such as the conventional lead seal, could achieve the effect of anti-theft and secrecy purposes or identifying an identity information of the position, the conventional lead seal is generally made of relatively soft materials, and thus when the conventional lead seal is provided in an environment where moving machines frequently pass by or hard objects are present, the conventional lead seal might be damaged due to accidental collision with surrounding objects, thereby resulting in the problem of accidental damage of the conventional lead seal due to the conventional lead seal lacking resistance to collision. As a result, such lead seal is not suitable for use in harsh environments.

BRIEF SUMMARY OF THE INVENTION

In view of the above, the primary objective of the invention is to provide a collision-resistant tag, which could avoid the problem that the tag is easily damaged by collision and a wire for fixing the tag falls off when the tag is disposed in a harsh environment.

The present invention provides a cable-type radio frequency identification tag, including a cable clamp, a protecting case, a radio frequency identification rivet, and a cable. The cable clamp has a clamp body. The clamp body has a first hardness and has a cable fixing hole and a cable through hole that are provided side by side. A direction of the cable fixing hole extending is defined as an axial direction. The clamp body has a receiving space. The receiving space communicates with the cable through hole. A ratchet gear is provided in the receiving space. A part of the ratchet gear enters the cable through hole. Two opposite sides of the clamp body in a direction perpendicular to the axial direction have a first surface and a second surface, respectively. A first pin hole penetrates through the first surface and the second surface. The protecting case has a second hardness greater than the first hardness. The protecting case includes a case body and a cover plate. The case body is wrapped around the clamp body. A side of the case body corresponding to the second surface has a first case body hole, and another side of the case body corresponding to the first surface has a notch. The cover plate is provided on the notch and has a first cover plate hole. The first cover plate hole, the first pin hole, and the first case body hole communicating with one another.

The radio frequency identification rivet includes a rivet body and a radio frequency identification block. The rivet body has a rod portion and a head portion connected to the rod portion. The rod portion penetrates through the first cover plate hole, the first pin hole, and the first case body hole. An end of the rod portion opposite to the head portion forms a riveting head adapted to fasten the case body. The head portion has a counterbore. The radio frequency identification block fits in the counterbore, wherein a radio frequency identification chip is provided inside the radio frequency identification block. The cable has two ends, wherein an end of the cable penetrates through the cable fixing hole for fixing, and another end of the cable is adapted to penetrate through the cable through hole. When the cable penetrates through the cable through hole, a part of the cable is unidirectionally meshed by the ratchet gear without being withdrawn outward, so that the cable forms a shape of a fitting ring.

With the aforementioned design, the protecting case is harder than the cable clamp, so that the cable clamp fixing the cable is protected by the protecting case. thereby preventing the cable clamp from direct collisions. In this way, the problem that the function of the cable clamp for fixing the cable might be lost and the cable falls off when the cable clamp is damaged by collisions could be avoided. Thus, the cable-type radio frequency identification tag of the present invention is suitable for being applied to a harsh environment, and reading or writing the information for identity identification or maintenance could be performed through the radio frequency identification chip of the radio frequency identification rivet.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
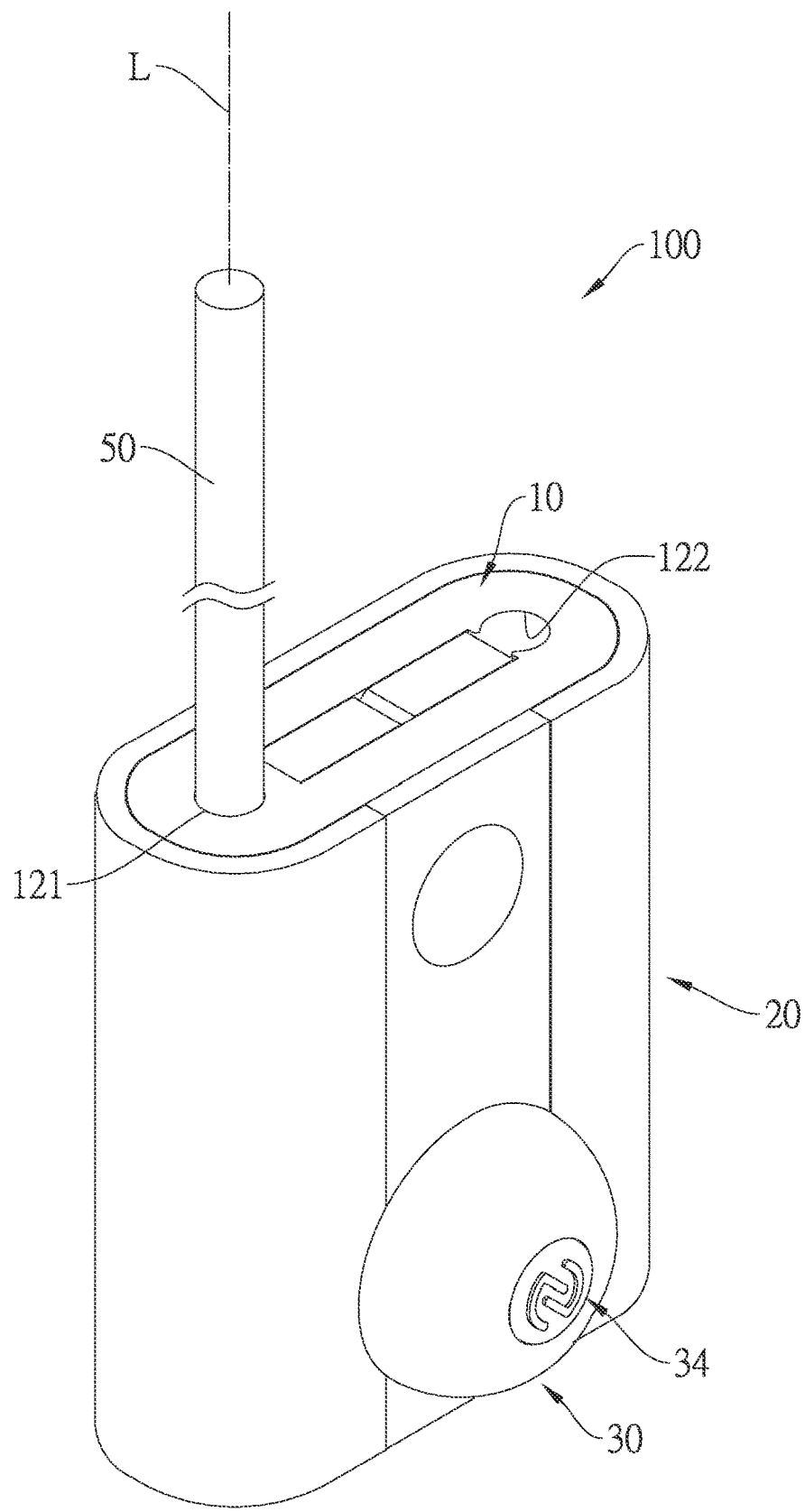
FIG. 1 is a perspective view of the cable-type radio frequency identification tag according to an embodiment of the present invention.
Figure 2:
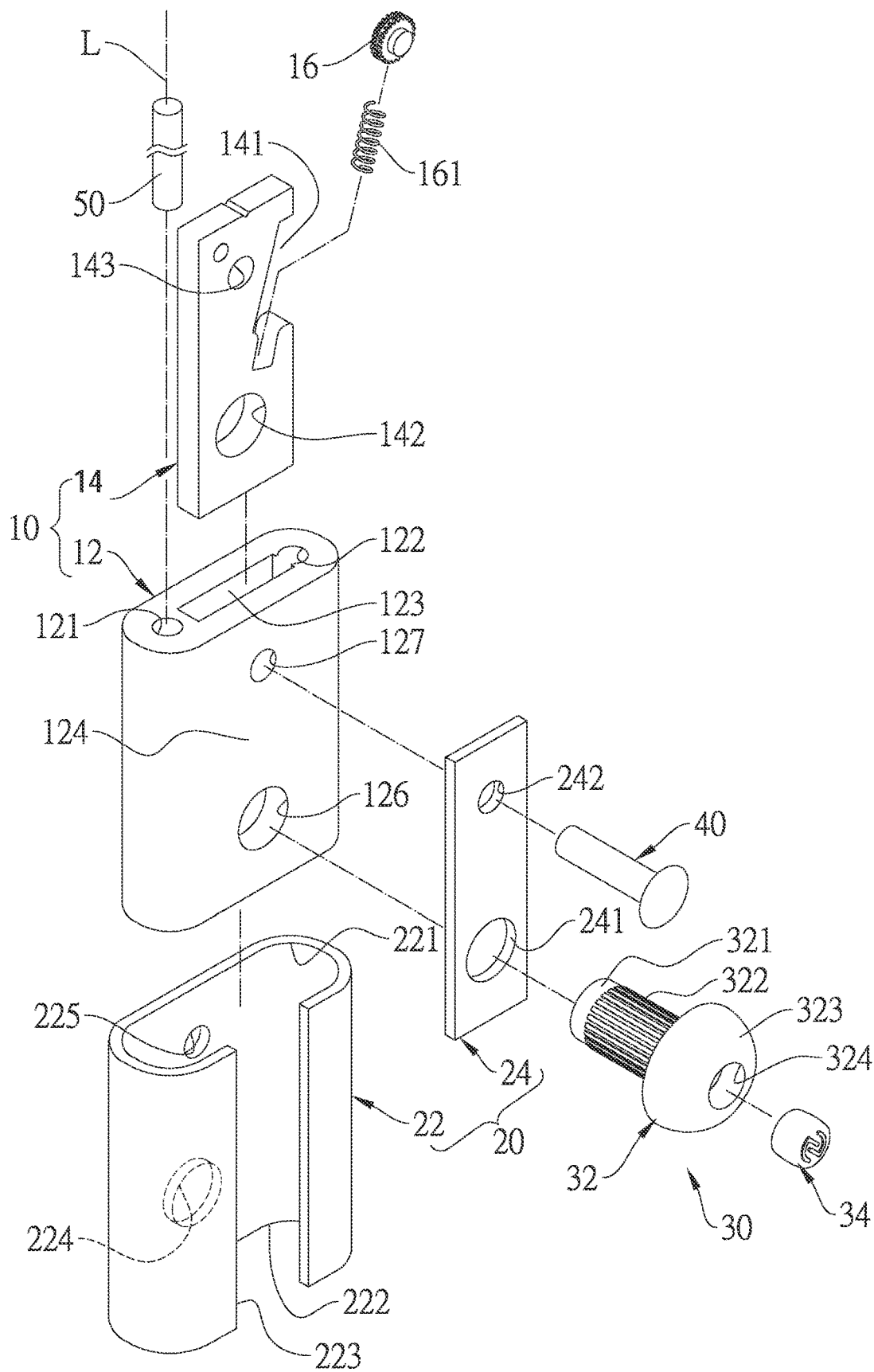
FIG. 2 is an exploded view of the cable-type radio frequency identification tag according to the embodiment of the present invention.
Figure 3:
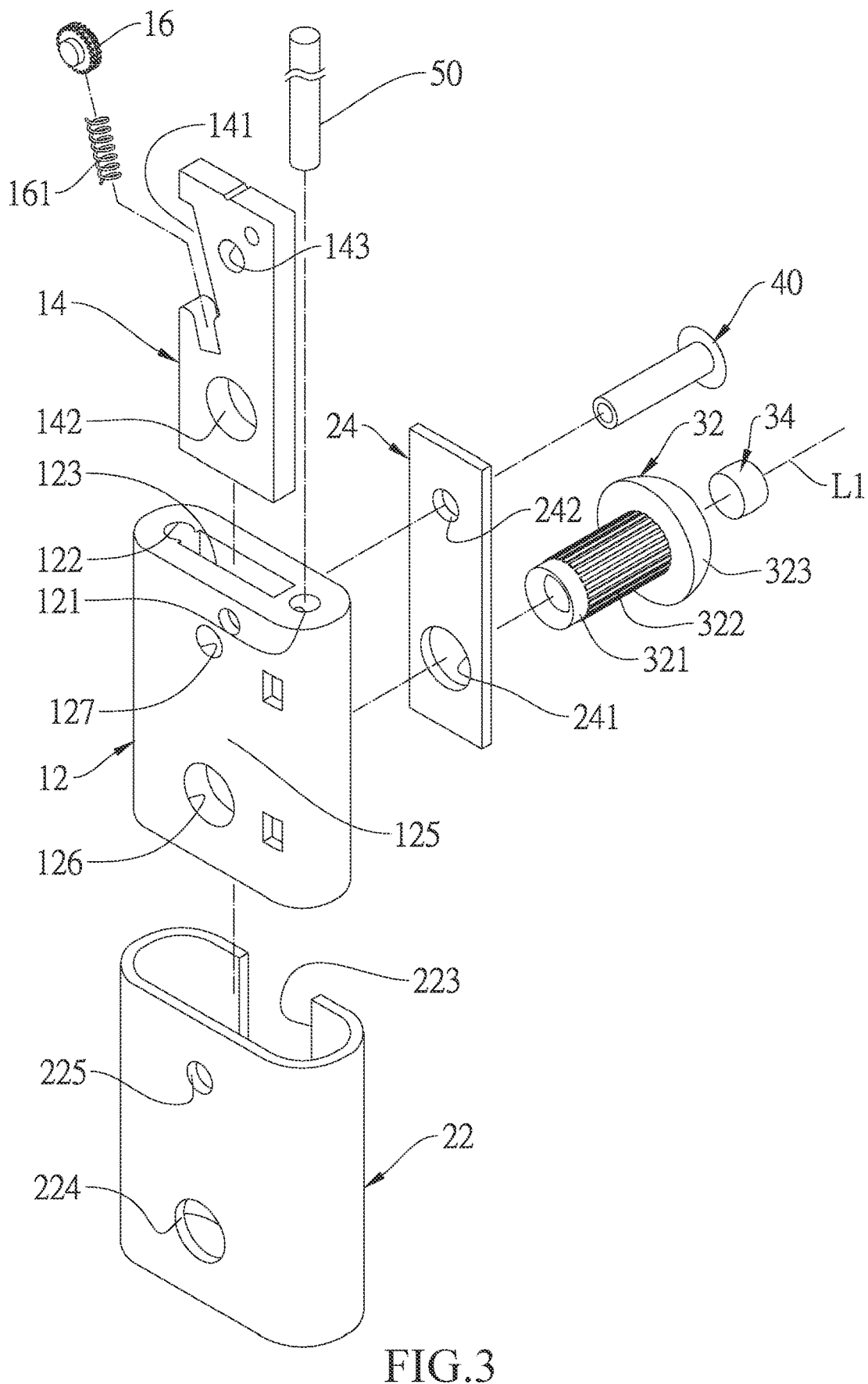
FIG. 3 is an exploded view of the cable-type radio frequency identification tag according to the embodiment of the present invention seen from another perspective.
Figure 4:
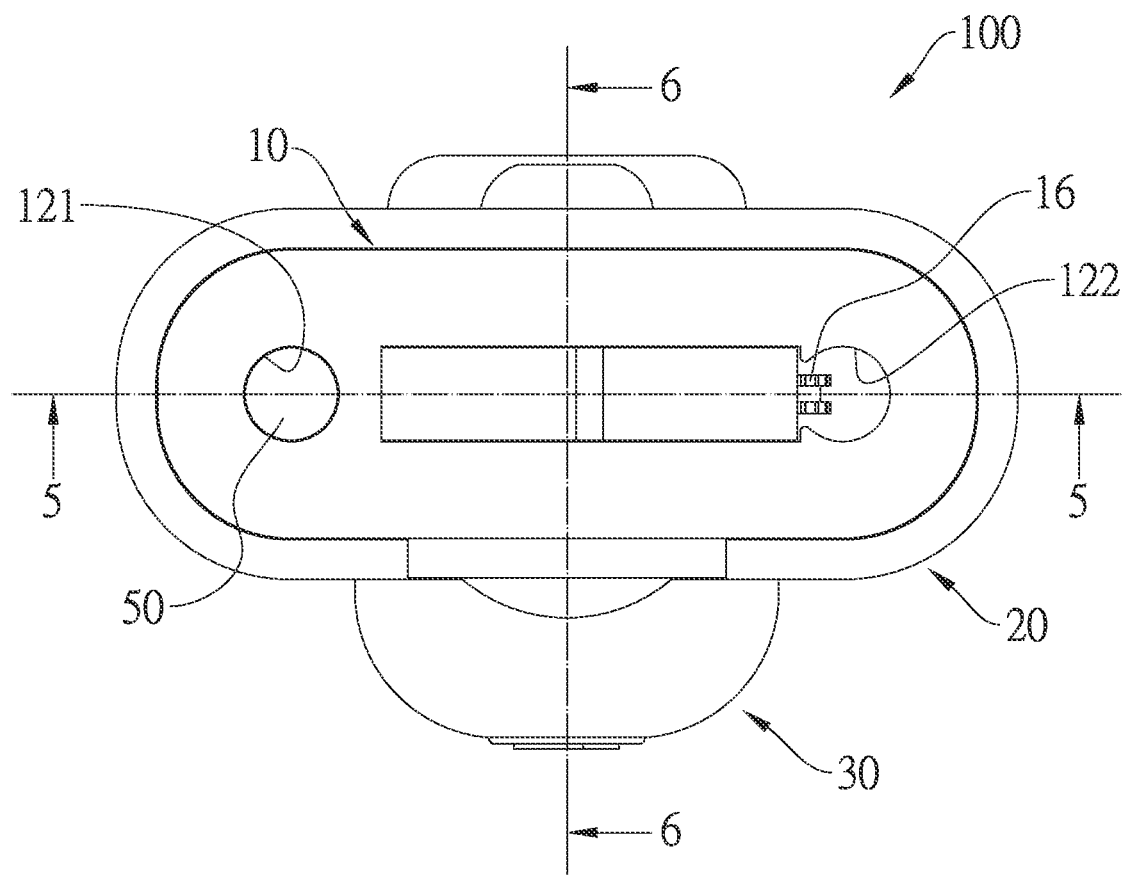
FIG. 4 is a top view of the cable-type radio frequency identification tag according to the embodiment of the present invention.
Figure 5:
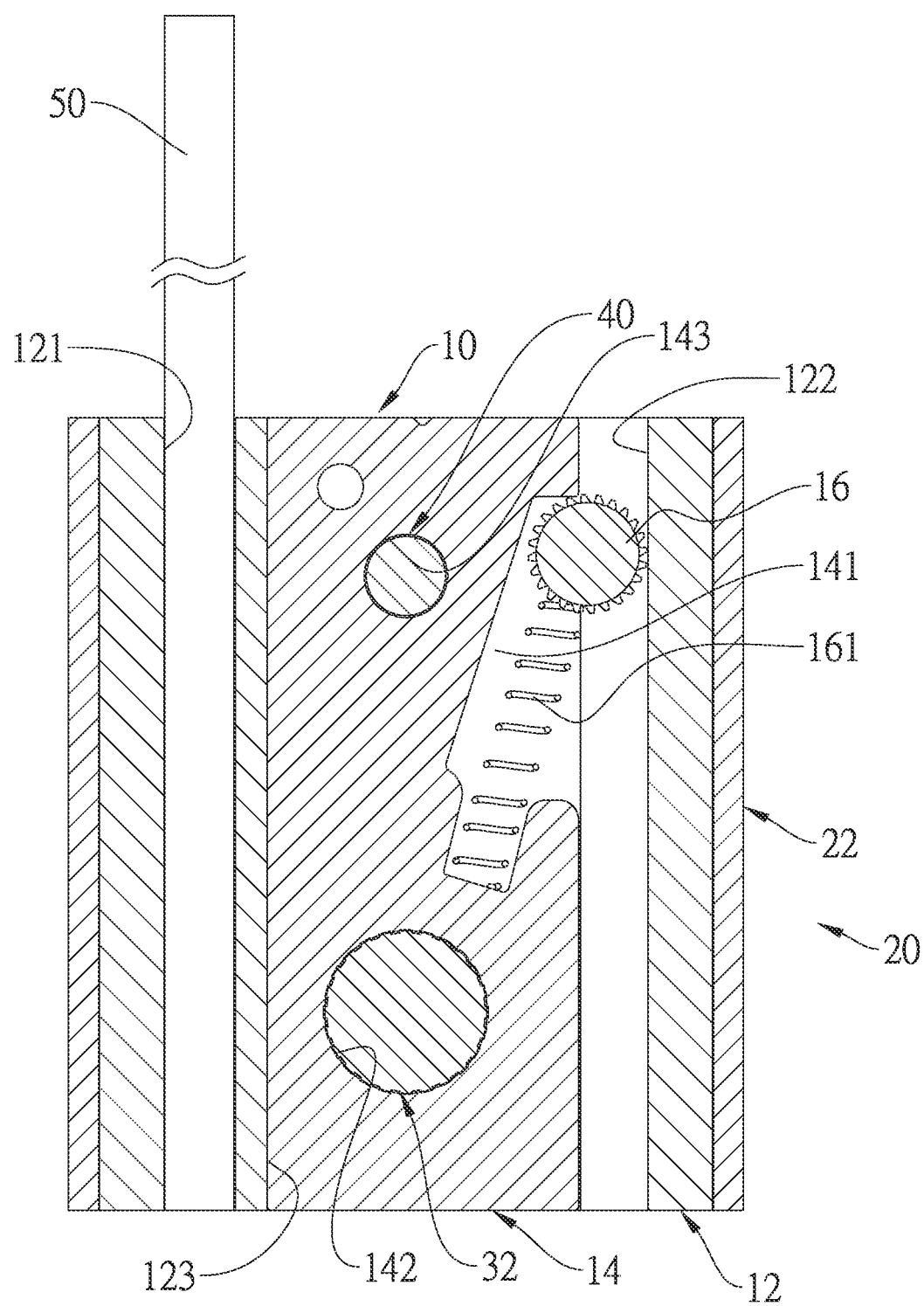
FIG. 5 is a sectional view along the 5-5 line in FIG. 4.
Figure 6:
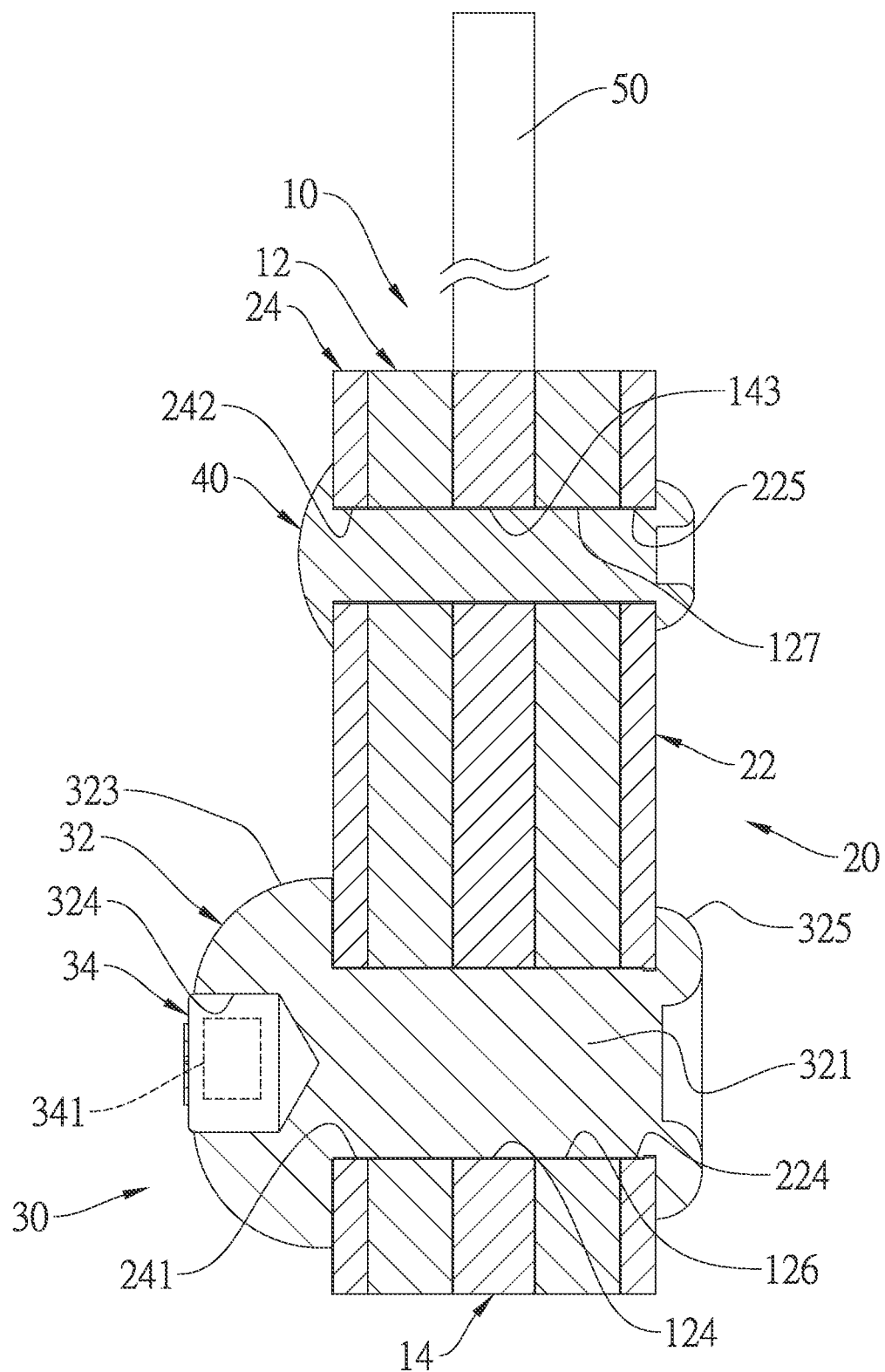
FIG. 6 is a sectional view along the 6-6 line in FIG. 4.

A cable-type radio frequency identification tag 100 according to an embodiment of the present invention is illustrated in FIG. 1 to FIG. 6 and includes a cable clamp 10, a protecting case 20, a radio frequency identification rivet 30, and a cable 50.

The cable clamp 10 has a clamp body 12. Specifically, the clamp body 12 is a flat block that is formed by aluminum extrusion and has a first hardness, wherein the first hardness is measured by Mohs hardness test, Rockwell hardness test, or other common hardness tests. In other embodiments, the clamp body 12 could be made of metals, such as aluminum, copper, magnesium, that are easily extruded and machined and are deformed by stamping more easily than the protecting case 20.

The clamp body 12 has a cable fixing hole 121 and a cable through hole 122 that are provided side by side. In the current embodiment, both of the cable fixing hole 121 and the cable through hole 122 are a through hole, and the cable fixing hole 121 is substantially parallel to the cable through hole 122. A direction of the cable fixing hole 121 extending is defined as an axial direction L. A middle of the clamp body 12 has a receiving space 123. The receiving space 123 communicates with an inside of the cable through hole 122. Two opposite sides of the clamp body 12 in a direction perpendicular to the axial direction L have a first surface 124 and a second surface 125, respectively. A first pin hole 126 penetrates through the first surface 124 and the second surface 125. An axial direction of the first pin hole 126 is defined as a first direction L1. A ratchet gear 16 is provided in the receiving space 123, wherein a part of the ratchet gear 16 enters the cable through hole 122.

The protecting case 20 includes a case body 22 and a cover plate 24. Specifically, the case body 22 and the cover plate 24 respectively are a sheet metal part and respectively have a second hardness, wherein the second hardness is measured by Mohs hardness test, Rockwell hardness test, or other common hardness tests. In the current embodiment, the case body 22 and the cover plate 24 respectively are a sheet metal part made of stainless steel, and the second hardness of the case body 22 and the second hardness of the cover plate 24 are greater than the first hardness of the clamp body 12. In other embodiments, the protecting case 20 could be made of other metals with a hardness greater than the clamp body 12.

The case body 22 is wrapped around the clamp body 12, and two opposite sides of the case body 22 in the axial direction L have a first opening 221 and a second opening 222, respectively. The clamp body 12 is received in the case body 22, and a surface of two opposite sides of the clamp body 12 in the axial direction L are aligned with a peripheral edge of the first opening 221 and a peripheral edge of the second opening 222, respectively. A side of the case body 22 corresponding to the first surface 124 has a notch 223, which penetrates through the two opposite sides of the case body 22 in the axial direction L along the axial direction L, and another side of the case body 22 corresponding to the second surface 125 has a first case body hole 224, which communicates with the first pin hole 126 of the clamp body 12. The cover plate 24 is a plate with a shape matching with the notch 223 and is disposed on the notch 223. The cover plate 24 has a first cover plate hole 241, which communicates with the first pin hole 126.

The radio frequency identification rivet 30 includes a rivet body 32 and a radio frequency identification block 34. The rivet body 32 has a rod portion 321 and a head portion 323 connected to the rod portion 321. The head portion 323 has a counterbore 324. The rod portion 321 penetrates through the first cover plate hole 241 of the cover plate 24, the first pin hole 126 of the clamp body 12, and the first case body hole 224 of the case body 22 in order, wherein an end of the rod portion 321 opposite to the head portion 323 is riveted to form a riveting head 325 adapted to fasten the clamp body 12, so that the cover plate 24, the clamp body 12, and the case body 22 are firmly fastened and clamped. The radio frequency identification block 34 is an elastic block made of rubber or plastic and fits in the counterbore 324. A radio frequency identification (RFID) chip 341 is provided inside the radio frequency identification block 34 for near-field reading an information stored in the radio frequency identification chip 341 or writing an information into the radio frequency identification chip 341.

The cable 50 has two ends, wherein an end of the cable 50 penetrates through the cable fixing hole 121 of the cable clamp 10 for fixing. Specifically, after the end of the cable 50 penetrates through the cable fixing hole 121, stamping is performed on a periphery of the cable fixing hole 121, so that a hole wall of the cable fixing hole 121 tightly clamps the end of the cable 50 inserted into the cable fixing hole 121 for fixing. Another end of the cable 50 is adapted to penetrate through the cable through hole 122 of the cable clamp 10. In other embodiments, the end of the cable 50 penetrating through the cable fixing hole 121 could be engaged with the cable fixing hole 121 through different fixing ways, such as welding, screwing, adhering, or fastening.

Figure 7:
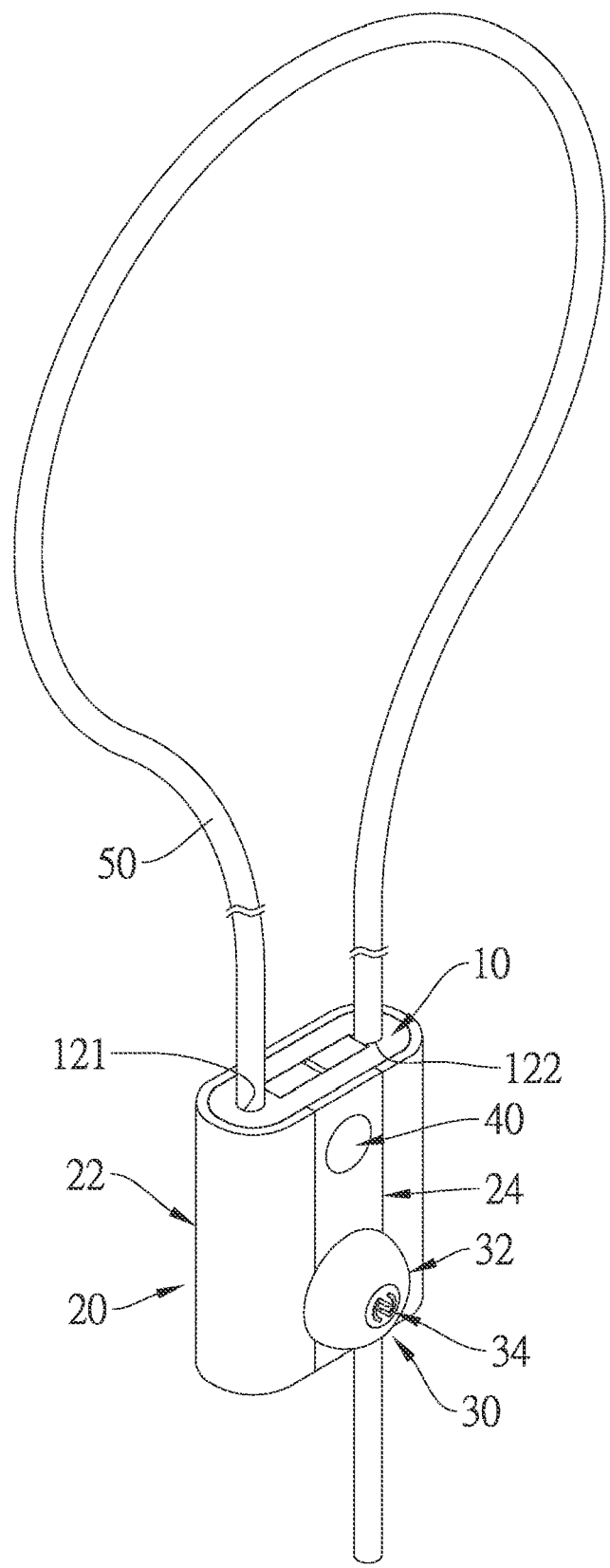
FIG. 7 is a schematic view, showing the cable penetrating through the cable through hole according to the embodiment of the present invention.
Figure 8:
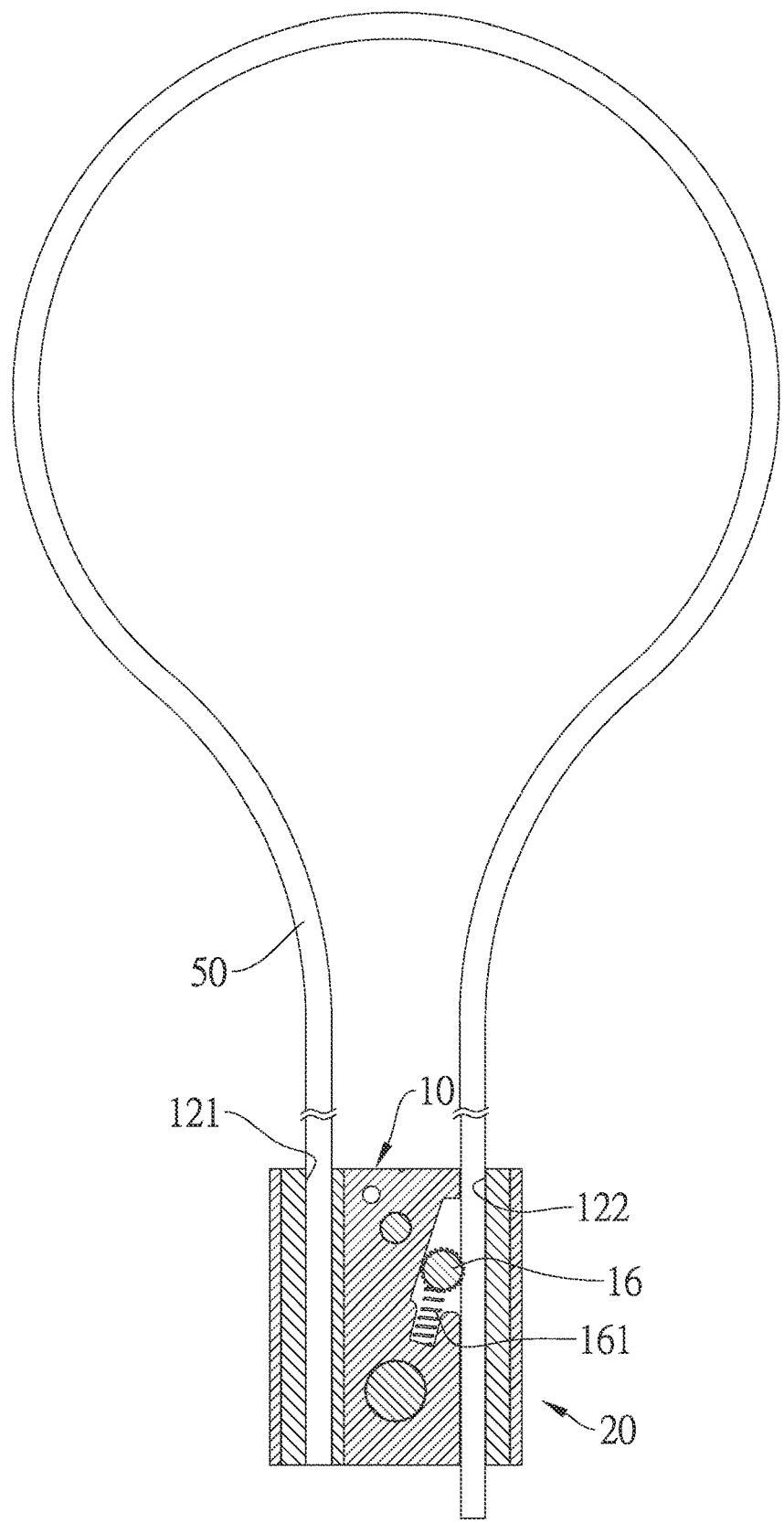
FIG. 8 is a sectional schematic view, showing the cable penetrating through the cable through hole according to the embodiment of the present invention.

Referring to FIG. 1, FIG. 7, and FIG. 8, when the embodiment is used, the cable-type radio frequency identification tag 100 is hung on an equipment, such as a mechanical device or a liquid pipeline, through the cable 50, and the information stored in the radio frequency identification chip 341 of the radio frequency identification rivet 30 could be read upon checking a maintenance status of the equipment, so that an inspection staff could obtain the information related to a maintenance history of the equipment. Alternatively, after inspecting the equipment, the information related to the inspection could be written into the radio frequency identification chip 341 of the cable-type radio frequency identification tag 100 hung on the equipment, so that the information required is stored in the radio frequency identification chip 341 for reading in subsequent inspections.

When the cable-type radio frequency identification tag 100 is disposed, the another end, i.e., a free end, of the cable 50 bypasses a position where the cable-type radio frequency identification tag 100 is about to be hung, and then the free end of the cable 50 penetrates through the cable through hole 122 of the cable clamp 10. When the free end of the cable 50 penetrates through the cable through hole 122, and the cable 50 passes through a side of the ratchet gear 16, a part of the cable 50 is unidirectionally meshed with the ratchet gear 16. At that time, the free end of the cable 50 is stuck by the ratchet gear 16 if the free end of the cable 50 is about to be withdrawn, and the free end of the cable 50 could only continue to penetrate through the cable through hole 122 without being withdrawn in a reverse direction. Thus, the cable-type radio frequency identification tag 100 is hung on and fits around a disposing position, such as a mechanical device or a liquid pipeline, by the cable 50 forming a shape of a fitting ring with the two ends restricted by the cable clamp 10; at that time, if the cable-type radio frequency identification tag 100 is required to be separated from the disposing position, the fitting ring of the cable 50 could only be released by breaking the cable clamp 10, thereby achieving the effect of the disposable use for secrecy and anti-theft purpose and confirmation of information correctness.

When the cable-type radio frequency identification tag 100 is disposed in an environment, where moving objects such as devices and vehicles or hard objects are present, the cable clamp 10 fixing the cable 50 could be protected by the protecting case 20 with the design of the protecting case 20 being harder than the cable clamp 10, so that the problem that the function of the cable clamp 10 for fixing the cable 50 might be lost after the cable clamp 10 is damaged by collisions could be avoided. In addition, when the clamp body 12 is metal extruded, sharp burrs might be produced on a periphery of the clamp body 12. Thus, by wrapping the protecting case 20 around the clamp body 12, a human injury due to touching the burrs of the clamp body 12 could be avoided. With the design of the rivet body 32 riveting the cover plate 24, the clamp body 12 and the case body 22, the clamp body 12 could be clamped by the case body 22 and the cover plate 24 on two sides in the first direction L1, so that the effect of the cable clamp 10 being fastened in the protecting case 20 without being easily separated could be achieved.

Referring to FIG. 1 to FIG. 5, the receiving space 123 of the clamp body 12 is a space penetrating in the axial direction L. A core plate 14 matching with the receiving space 123 is provided. The core plate 14 is inserted into the receiving space 123 of the clamp body 12 and is tightly abutted by a hole wall of the receiving space 123 for fixing. A side of the core plate 14 close to the cable through hole 122 has a chute 141, wherein the chute 141 communicates with the cable through hole 122. The ratchet gear 16 is located in the chute 141. A spring 161 is provided to abut between the ratchet gear 16 and an inner end of the chute 141. The spring 161 abuts against the ratchet gear 16 in a direction inclined relative to the axial direction L for supporting the ratchet gear 16, so that the part of the ratchet gear 16 enters the cable through hole 122. A position of the cover plate 14 corresponding to the first pin hole 126 has a first core plate hole 142, wherein the first core plate hole 142 communicates with the first pin hole 126.

The rivet body 32 has a knurl 322 on a periphery of the rod portion 321. When the rod portion 321 of the rivet body 32 penetrates through the first core plate hole 142, the first pin hole 126, the first cover plate hole 241, and the first case body hole 224, the knurl 322 abuts against a hole wall of the first core plate hole 142, a hole wall of the first pin hole 126, a hole wall of the first cover plate hole 241, and a hole wall of the first case body hole 224, so that the rivet body 32 could be riveted more tightly on the first core plate hole 142, the first pin hole 126, the first cover plate hole 241, and the first case body hole 224.

A second pin hole 127 penetrates through the first surface 124 and the second surface 125 of the clamp body 12 in the first direction L1. A position of the core plate 14 corresponding to the second pin hole 127 has a second core plate hole 143. A side of the case body 22 corresponding to the second surface 125 has a second case body hole 225, wherein the second case body hole 225 communicates with the second pin hole 127 of the clamp body 12. The cover plate 24 has a second cover plate hole 242, wherein the second cover plate hole 242 communicates with the second pin hole 127. A second rivet 40 is riveted on the second core plate hole 143, the second pin hole 127, the second cover plate hole 242, and the second case body hole 225, so that the protecting case 20 could be riveted more tightly around the cable clamp 10 through the second rivet 40.

It must be pointed out that the embodiments described above are only some preferred embodiments of the present invention. All equivalent structures which employ the concepts disclosed in this specification and the appended claims should fall within the scope of the present invention.

What is claimed is:

1. A cable-type radio frequency identification tag, comprising:
a cable clamp having a clamp body, wherein the clamp body has a first hardness and has a cable fixing hole and a cable through hole that are provided side by side; a direction of the cable fixing hole extending is defined as an axial direction; the clamp body has a receiving space, wherein the receiving space communicates with the cable through hole; a ratchet gear is provided in the receiving space; a part of the ratchet gear enters the cable through hole; two opposite sides of the clamp body in a direction perpendicular to the axial direction has a first surface and a second surface, respectively; a first pin hole penetrates through the first surface and the second surface;
a protecting case having a second hardness greater than the first hardness and comprising a case body and a cover plate, wherein the case body is wrapped around the clamp body; a side of the case body corresponding to the second surface has a first case body hole, and another side of the case body corresponding to the first surface has a notch; the cover plate is provided on the notch and has a first cover plate hole, wherein the first cover plate hole, the first pin hole, and the first case body hole communicate with one another;
a radio frequency identification rivet comprising a rivet body and a radio frequency identification block, wherein the rivet body has a rod portion and a head portion connected to the rod portion; the rod portion penetrates through the first cover plate hole, the first pin hole, and the first case body hole; an end of the rod portion opposite to the head portion forms a riveting head adapted to fasten the case body; the head portion has a counterbore; the radio frequency identification block fits in the counterbore, wherein a radio frequency identification chip is provided inside the radio frequency identification block; and
a cable having two ends, wherein an end of the cable penetrates through the cable fixing hole for fixing, and another end of the cable is adapted to penetrate through the cable through hole; when the cable penetrates through the cable through hole, a part of the cable is unidirectionally meshed by the ratchet gear without being withdrawn outward, so that the cable forms a shape of a fitting ring.

2. The cable-type radio frequency identification tag as claimed in claim 1, wherein a periphery of the rod portion of the rivet body has a knurl; the knurl abuts against a hole wall of the first pin hole, a hole wall of the first cover plate hole, and a hole wall of the first case body hole.

3. The cable-type radio frequency identification tag as claimed in claim 1, wherein the receiving space penetrates through the clamp body in the axial direction; a core plate is fixed in the receiving space, wherein a side of the core plate close to the cable through hole has a chute communicating with the cable through hole; the ratchet gear is located in the chute; a spring is provided to abut between the ratchet gear and an inner end of the chute, wherein the spring abuts against the ratchet gear in a direction inclined relative to the axial direction for supporting the ratchet gear, so that the part of the ratchet gear enters the cable through hole.

4. The cable-type radio frequency identification tag as claimed in claim 3, wherein a periphery of the rod portion of the rivet body has a knurl; the knurl abuts against a hole wall of the first pin hole, a hole wall of the first cover plate hole, and a hole wall of the first case body hole.

5. The cable-type radio frequency identification tag as claimed in claim 3, wherein a position of the core plate corresponding to the first pin hole has a first core plate hole; the rod portion penetrates through the first core plate hole.

6. The cable-type radio frequency identification tag as claimed in claim 5, wherein a periphery of the rod portion of the rivet body has a knurl; the knurl abuts against a hole wall of the first pin hole, a hole wall of the first cover plate hole, and a hole wall of the first case body hole.

7. The cable-type radio frequency identification tag as claimed in claim 5, wherein a second pin hole penetrates through the first surface and the second surface of the clamp body; a position of the core plate corresponding to the second pin hole has a second core plate hole; a side of the case body corresponding to the second surface has a second case body hole; the second case body hole communicates with the second pin hole of the clamp body; the cover plate has a second cover plate hole, wherein the second cover plate hole communicates with the second pin hole of the clamp body; a second rivet is riveted on the second core plate hole, the second pin hole, the second cover plate hole, and the second case body hole.

8. The cable-type radio frequency identification tag as claimed in claim 7, wherein a periphery of the rod portion of the rivet body has a knurl; the knurl abuts against a hole wall of the first pin hole, a hole wall of the first cover plate hole, and a hole wall of the first case body hole.

\* \* \* \* \*